United States Patent [19]

Holman et al.

[11] 4,113,242
[45] Sep. 12, 1978

[54] RELEASABLE, HIGH-PRESSURE SEAL AND METHOD OF FORMING SAME

[75] Inventors: Robert R. Holman, Bethel Park; Daniel N. Turkall, West Mifflin, both of Pa.

[73] Assignee: Electric Power Research Institute, Inc., Palo Alto, Calif.

[21] Appl. No.: 737,761

[22] Filed: Nov. 1, 1976

[51] Int. Cl.² .................. G21F 5/00; B65D 51/00
[52] U.S. Cl. ............................. 277/1; 277/101; 277/128; 250/507; 220/240; 215/12 R; 215/270; 285/110
[58] Field of Search .......... 277/101, 126, 128, 237 R, 277/1; 250/506, 507, 515; 220/15, 240, 319, 320, 378; 215/12 R, 13 R, 270; 285/24, 110, 133 R, 365

[56] References Cited

U.S. PATENT DOCUMENTS

| | | | |
|---|---|---|---|
| 2,687,229 | 8/1954 | Laurent | 220/240 |
| 2,769,648 | 11/1956 | Herman | 285/110 |
| 2,848,135 | 8/1958 | Rickard et al. | 220/240 |
| 3,256,441 | 6/1966 | Grasty | 250/506 |
| 3,367,682 | 2/1968 | Meriano | 285/110 X |
| 3,473,556 | 10/1969 | Johnson et al. | 285/110 X |
| 3,952,724 | 4/1976 | Pei | 215/13 R X |
| 3,967,837 | 7/1976 | Westerlund et al. | 285/365 X |

FOREIGN PATENT DOCUMENTS

| | | | |
|---|---|---|---|
| 1,077,012 | 3/1960 | Fed. Rep. of Germany | 285/110 |
| 1,170,810 | 5/1964 | Fed. Rep. of Germany | 220/321 |
| 1,060,239 | 3/1967 | United Kingdom | 285/133 R |
| 1,205,926 | 9/1970 | United Kingdom | 285/110 |

*Primary Examiner*—Robert S. Ward, Jr.
*Attorney, Agent, or Firm*—Townsend and Townsend

[57] ABSTRACT

A releasable, high-pressure seal is formed between axially aligned conduits each fitted with an end flange. One of the end flanges is relatively rigid. The other end flange is relatively resilient and slightly frustroconically shaped. The periphery of the resilient flange is connected to its associated conduit. A seal ring is disposed between the two flanges in proximity of the opening through the flanges. Fluid pressure applied to the inside of the resilient flange biases that flange towards the rigid flange because the portion of the former radially outward of the seal ring is subjected to ambient pressure only. In this manner the sealing force applied against the seal ring is increased proportionally to the fluid pressure interiorly of the conduits. A pair of opposing, inner conduits are rigidly secured to the respective outer conduits and they protrude past the outer conduits. They engage each other first when the conduit sets are axially moved towards each other so that the inner conduits act as a centering device. A seal is placed between ends of the inner conduits and the conduit sets are secured to each other with a peripheral clamp engaging opposing peripheral collars of the outer conduits.

26 Claims, 6 Drawing Figures

RELEASABLE, HIGH-PRESSURE SEAL AND METHOD OF FORMING SAME

BACKGROUND OF THE INVENTION

Each time two conduits are secured to each other the resulting connection must be sealed to prevent the escape of pressurized fluid flowing in the conduits. It is well known that increasingly high pressures place correspondingly more stringent requirements on the seal between the conduits. The most common manner of sealing two conduit ends while permitting their separation is with well-known flange connections. Briefly, such connections comprise a pair of flat, radial flanges which define opposing end faces that are drawn together with a multiplicity of circumferentially spaced, threaded bolts. A seal ring, normally a simple O-ring, is placed in a suitably designed groove between the opposing end faces and prevents the escape of pressurized fluid from between the two flanges.

Such connections have the advantage that they are suitable for even the highest pressure applications. Moreover, manufacturing tolerances are relatively loose since the opposing flanges can be tightened as much as necessary to generate the desired, axially acting sealing force between the seal ring and the opposing flange faces. However, the seal can tolerate virtually no deflection between the flanges. As a consequence the flanges must be relatively massive and a large number of bolts is required to maintain the flanges in a rigid, non-yielding face-to-face contact when pressure is applied to the conduit.

For applications in which there is only limited access such a conduit connection is not feasible. For example, in high radiation areas such as are found in nuclear reactors and the like access to the flanged connection is often only possible via remote-controlled equipment. Such equipment is inherently ill-equipped to form conduit connections by placing and tightening large numbers of circumferentially spaced bolts. To overcome this problem it is necessary to either provide very expensive and fail-prone handling equipment capable of applying and releasing the above-described flange connection or, in the alternative, to form seal-tight conduit connections which do not rely on the relatively high contact pressure required of face seals. Such connections, however, require very close tolerances and high-quality surface finishes which are easily damaged during handling. Accordingly, both alternatives are expensive and the latter is fail-prone. As always, high cost is undesirable. In installations involving radioactive materials failure of a connection is intolerable.

The problem is compounded when a seal-tight, releasable connection is to be formed between pairs of inner and outer conduits wherein both conduits must be simultaneously sealed. Such an application can again be found in areas of high radioactivity such as in a so-called Tokamak Fusion Test Reactor, a device contemplated for burning long-lived actinide waste produced in fission reactors to transform long-lived fission reactor waste products into more acceptable, shorter-lived radioactive waste products before their ultimate disposal. In such fusion reactors it is contemplated to place the actinide pellets in several containers each of which is enclosed within a housing and to flow a suitable cooling medium from each housing into the corresponding container. The housings-container sets are in turn releasably mounted to a double, i.e., an inner and an outer manifold for circulation of the cooling medium. The containers must be periodically replaced and since they are in a radioactively contaminated area access to the containers is possible only via remote handling equipment. For the above-described reasons conventional flanged connections are not feasible. Similarly, other types of sealed, releasable conduit connections such as those relying upon close tolerances and high-quality surface finishes to establish a seal are not sufficiently fail-safe for installations of this type.

SUMMARY OF THE INVENTION

The present invention provides a releasable, high-pressure seal, capable of withstanding pressures in excess of 70 atmospheres, which is relatively inexpensive and which does not exhibit the drawbacks of prior art, releasable conduit connections discussed above. Generally speaking, the present invention contemplates to mount first and second end flanges to respective conduits with each flange having a central opening for flowing a fluid under superatmospheric pressure therethrough. A seal ring is disposed between the end flanges for sealing the interior of the conduits from the exteriors. Means is provided for applying a force to the seal ring acting substantially parallel to the axis of the conduits and for varying the force as a function of the interior fluid pressure. Means is further provided for securing the flanges to each other.

More specifically, one of the flanges has a generally frustoconical shape and is relatively resilient. Its outer periphery is secured to the corresponding conduit so that the portion of the resilient flange proximate its opening protrudes towards the opposing flange. The force-applying means comprises the positioning of the seal ring proximate to and in encircling relationship with respect to the central opening of the flanges so that the seal ring is relatively remote from the periphery of the resilient flange. In this manner the application of superatmospheric pressure to the fluid interiorly of the conduits biases the resilient flange towards the other flange and, therewith, towards the seal ring with a force that is proportional to the pressure differential between the interior and the exterior of the conduits.

With such a releasable connection it is no longer necessary mechanically to exert the relatively large contact pressures between the seal ring, e.g., an O-ring, and the opposing flange faces. Instead, all that is necessary is that an initial contact force be established which is sufficient to initially seal the flanges to each other. As soon as an actual pressure differential between the interior and the exterior of the conduits is established the contact force is correspondingly increased without requiring the application of an additional external force. If the member applying the holding force resiliently elongates, which would result in a fatal loss of the seal on a prior art bolted flange connection, the resilient or frustoconical flange of the present invention is simply further deformed by the fluid pressure acting on it to compensate for the elongation so that the seal is maintained. In this manner the heretofore necessary massive bolted flange connections can be replaced with a lighweight flange connection that is more readily handled with remotely controlled handling equipment.

Accordingly, the present invention contemplates to construct the means securing the flanges to each other in the form of peripheral collars which preferably extend over the full circumference of the flanges and which are drawn together with a circumferential clamp defined by first and second, hingedly interconnected clamp sections and means for releasably locking the sections to each other. Each clamp section has a generally U-shaped configuration dimensioned to fit over the radial collars so that the seal ring between the flanges simultaneously engages both flanges and the resilient, frustoconical flange is flattened relative to its relaxed state when the clamp is closed.

Such a connection is not capable of exerting the axial forces that can be generated with prior art bolted flange connections; however, for the reasons discussed above this is not necessary. The circumferential clamp can be readily constructed to generate the necessary force to maintain the flanges secured to each other even when subjected to such high pressures as 70 atmospheres or more. This clamp also readily generates the necessary force to establish an initial seal between the opposing flange faces and the seal ring. The necessary larger forces on the seal ring when the internal pressure increases are generated by the internal pressure. Resilient elongations of the clamp (in the direction of the conduit axis) is automatically compensated by a corresponding deflection of the resilient, frustoconical flange.

The releasable seal-tight connection of the present invention not only establishes a high-pressure seal with a simple holding clamp, the seal is established without requiring close tolerances or excessively high surfaces finishes. The loose tolerances and non-critical surface finishes of prior art bolt-flange connections can be maintained; the relatively large number of bolts (and a corresponding number of nuts) are replaced with a simple, circumferential clamp; and the massive prior art flanges are replaced with much lighter flanges since the heretofore necessary flange rigidity to maintain high pressure seals is no longer required. Accordingly, the cost of the releasable, high-pressure seal of the present invention compares favorably with the cost of prior art connections, yet it does not exhibit the drawbacks of the prior art connections.

The present invention is further ideally suited for applications in which sets of inner and outer conduits must be simultaneously sealed to each other such as are encountered in the above-discussed fusion reactors. For example, an inner conduit may be rigidly secured to each outer conduit and positioned concentric with respect to the openings in the flanges of the outer conduits. The inner conduits terminate in opposing end sections which are dimensioned so that they engage each other before the seal ring engages both flanges attached to the outer conduits when the collars are drawn together with the circumferential clamp. The end sections are provided with opposing, generally frustoconical, concentric surfaces and a complementarily shaped frustoconical seal ring is between the surfaces of the end sections to seal the inner conduit from the outer conduit.

In use, when the two conduit sets are axially brought together, they are first generally aligned with respect to each other and moved towards each other until the end sections of the inner conduits engage each other. This engagement axially aligns both inner and outer conduits and the movement is continued until the flanges of the outer conduits simultaneously engage the seal ring. The circumferential clamp is then applied over the peripheral collars and closed to secure the conduit sets to each other and to establish the above-described initial sealing force on the seal ring.

In this manner the present invention not only establishes a releasable double seal, normally a difficult feat in and of itself, but while establishing such a double seal it facilitates the alignment of the respective conduits. This is of great help in all applications. It is invaluable in radioactively contaminated environments such as in the above-discussed fusion reactors or similar applications where all parts must be handled by relatively fragile, remote handling equipment normally incapable of exerting large forces.

DESCRIPTION OF THE PREFERRED EMBODIMENTS

Figure 1:
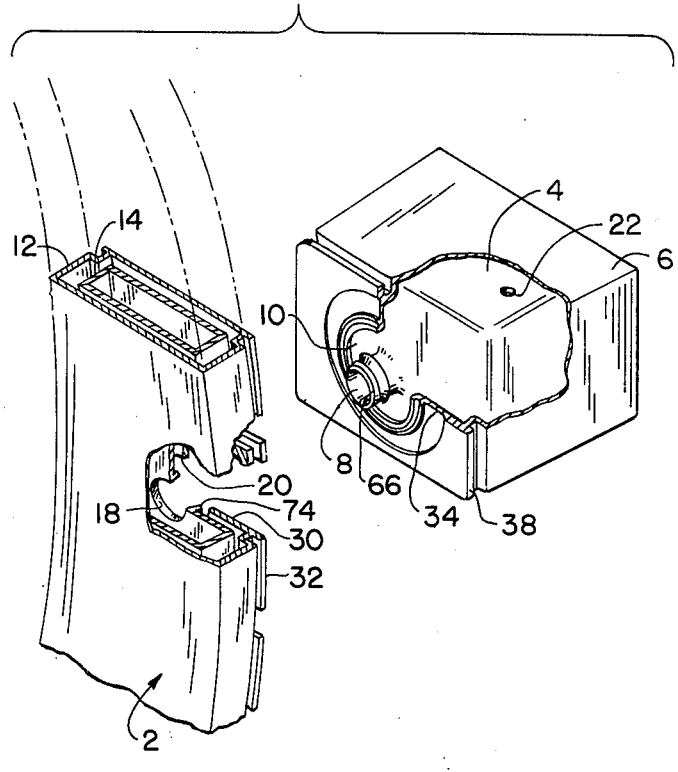
FIG. 1 is a fragmentary, perspective exploded side elevational view, with parts broken away, illustrating the releasable, high pressure double seal of the present invention as applied in the environment of a fusion reactor.

Referring first to FIG. 1, there is illustrated a double manifold 2 such as may be employed, for example, in a fission reactor for flowing a cooling medium to and from a container for holding actinide pellets, for example. The container is disposed within a housing 6 and includes a cooling medium discharge opening 8 protruding through a concentric opening 10 of the housing. The double manifold is defined by an outer conduit 12 and a concentric inner conduit 14 rigidly secured to the outer conduit by suitably disposed anchoring members 16 (shown in FIG. 2 only). One side of the double manifold has a pair of concentric, inner and outer openings 18, 20 which are arranged and dimensioned so that housing 6 and container 4 can be placed against a side of the double manifold and openings 8, 10 thereof register with the corresponding openings 18 and 20 in the manifold. A cooling medium can now flow through the outer conduit 12, the aligned outer openings 20 and 10, hence through appropriately placed apertures 22 in container 4 into the container interior for cooling the actinide pellets. From the container the now-heated cooling medium is discharged through coupled openings 8 and 18 into the inner conduit 14 for recirculation or disposal.

Since the cooling medium is under relatively high pressure and container 4 must be periodically replaced it is apparent that the connection between conduits 12, 14 and housing 6 and container 4, respectively, must be provided with a releasable seal 24. For the purposes of this patent application the conduits of the double manifold 2 as well as the housing 6 and the container 4 will hereafter be referred to as "conduits" since for the purposes of describing seal 24 the housing and the container could be conventional, cylindrical, and coaxial pipes, for example. Furthermore, for the purposes of the present invention it is not necessary that the two conduit sets, each set comprising an outer conduit and at least one inner conduit, be perpendicular to each other as is illustrated in FIG. 1. The conduits can be axially aligned and the invention will be described as such, it being understood that the term "axially aligned" refers to the relative positioning of at least the outer openings 10 and 20 irrespective of the orientation of the conduits per se.

Referring now to FIGS. 1-6, seal 24 comprises an outer sealed connection 26 between outer conduits 6, 12 and an inner sealed connection 28 between inner conduits 4, 14. For forming the outer seal one of the outer conduits, say conduit 12, is fitted with a relatively rigid planar flange 30 that is integral with the outer conduit but projects therefrom a slight distance as is best illustrated in the left-hand half of FIG. 1. The planar flange defines outer opening 20 and it includes a circumferential collar 32 which, in the embodiment shown in the drawings, has a generally rectangular shape and extends over 360°. If desired, the collar may extend over slightly less than 360° or it may be formed as a plurality of successive but spaced-apart collar sections (not shown).

Figure 2:
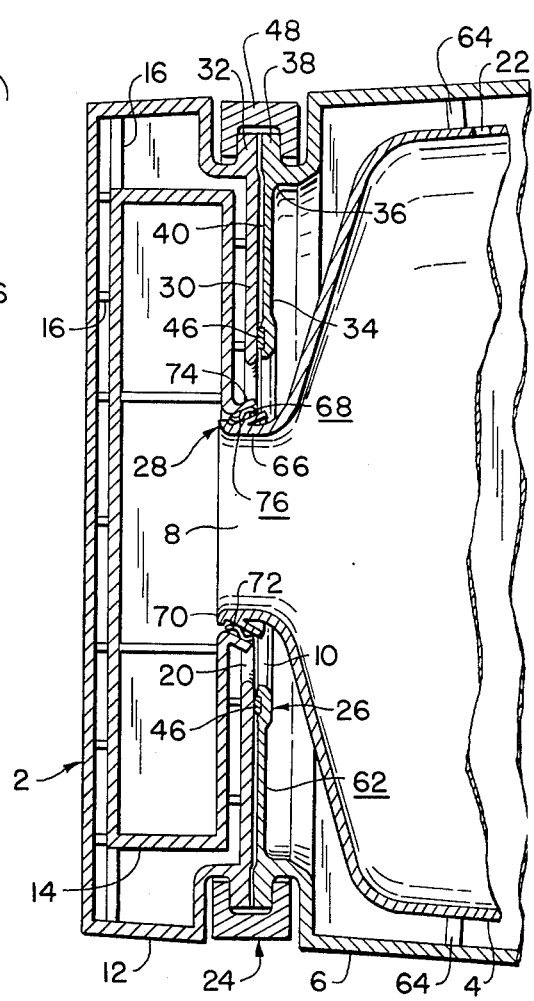
FIG. 2 is an enlarged, side elevational view, in section, and illustrates the seal of the present invention in greater detail.
Figure 4:
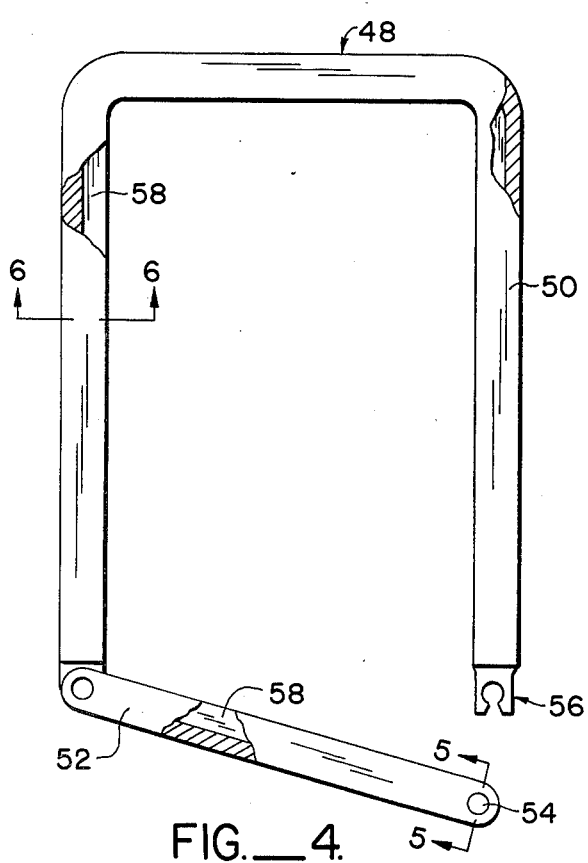
FIG. 4 is a side elevational view, with parts broken away, of a circumferential clamp for drawing together two conduits.
Figure 3:
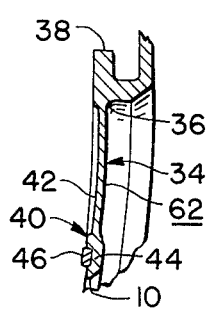
FIG. 3 is an enlarged, fragmentary side elevational view showing a resiliently deformable flange constructed in accordance with the present invention.
Figure 5:
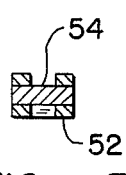
FIGS. 5 and 6 are cross-sectional views of the clamp taken along lines 5—5 and 6—6 of FIG. 4.

The opposing outer conduit 6 also defines a flange 34 which is, however, relatively resilient so that it can be deflected in the direction of the axis of conduit 6. A periphery 36 of the flange is connected to, e.g., integrally constructed with conduit 6 to define a doughnut-shaped disc that terminates at opening 10. In its relaxed state the inner end of the disc is bowed outwardly relative to the conduit, to the left as seen in FIG. 2, as is illustrated in detail in FIG. 3. In its relaxed state the disc has, therefore, a generally frustoconical configuration, its periphery 36 forming the base of the cone. It should be noted that for the purposes of this invention it is not necessary that the disc cross-section between the periphery and opening 10 be linear; it may be slightly curved as is illustrated in FIG. 3 and the term "frustoconical" as used herein includes such a shape.

A second circumferential collar 38, which has a shape complementary to that of collar 32, projects radially outward from disc 34. Its circumferential extent is the same as that of the opposing collar. For purposes more fully described hereinafter, a front side 40 of the disc includes an annular recess 42 and an annular groove 44 encircling opening 10 and disposed in close proximity with respect thereto for receiving a seal ring 46. The seal ring projects beyond front side 40 of the disc and when the flange and the disc are biased towards each other by a clamp 48 engaging collars 32, 38 the seal ring establishes a seal between flanges 30, 34 to prevent an escape of pressurized fluid therebetween.

Figure 6:
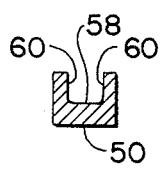

Clamp 48 has a shape complementary to that of the circumferential collars 32, 34, e.g., a rectangular shape, and comprises a first, C-shaped clamp member 50 and a second, straight clamp member 52. First ends of the members are hingedly interconnected while their other ends are fitted with a locking pin 54 cooperating with a catch 56 for releasably locking these ends to each other. Both clamp members have a U-shaped cross-section, as is best seen in FIG. 6, defining a circumferential, open groove 58 dimensioned to receive therein opposing circumferential collars 32 and 38.

In use the outer conduits 6, 12 are brought together and a relatively small axial force is applied to them to flatten the frustoconical disc 34. Clamp 48 is now placed over the circumferential collars and closed and locked thereby maintaining the flange and the disc in their proximate relation and the disc in its flattened position. Alternatively, side walls 60 of the clamp groove may be slightly outwardly tapered, the appropriate collar sides having a corresponding taper, so that the clamp can be placed over the collars while the disc is in its relaxed state and the collars are slightly spaced apart. Upon closing of the clamp the collars are drawn together to again flatten the resilient seal ring and establish an initial seal between flanges 30 and 34.

If the interior of the outer conduits is now pressurized a pressure differential exists between a back side 62 of the disc and the portion of its front side 40 radially outward of the seal ring 46. As a result, an axially oriented force the size of which is a function of the pressure differential is generated which pushes the portion of the disc in the vicinity of the seal ring towards the opposing rigid flange 30, thereby increasing the axial sealing force applied to the seal ring and thus allowing it to continue to seal the flanged connection even though the initial pressure on the seal ring was relatively low and the subsequently applied internal fluid pressure is relatively high. It will be noted that annular recess 42 in the front face 40 of the resilient flange assures that the space between the two flanges is at ambient pressure. The recess further aids the deformation of the flange when back side 62 is pressurized. It should also be noted that in the event the internal fluid pressure in conduits 6, 12 causes a slight elongation of clamp 48 in the direction of the axis of the conduits the flanges continue to be sealed because the pressure differential acting on the resilient flange causes a corresponding movement of the resilient flange in the opposite direction of the clamp elongation.

Inner sealed connection 28 is employed to both permit two fluids to independently flow in the inner and the outer conduits and further to center all members of the releasable seal 24 together with the associated conduits. For this purpose the inner conduits are rigidly secured to the outer conduits, inner conduit 14 via anchor post 16 and inner conduit 4 via a similar set of anchoring posts 64 so that movement of one conduit results in a corresponding movement of the other conduit of a conduit set.

Inner conduit 4 terminates in a tubular end section 66 that is concentric relative to the associated outer opening 10 and which protrudes some distance beyond disc 34. The end section terminates in a convex frustoconical sealing surface 68 which may include a radially outwardly turned end lip 70 so that a generally frustoconical seal ring 72 can more readily be retained to the end section. In a preferred embodiment of the invention the seal ring is a commercially available, two-faced "S" seal ring such as the one described in *Design News,* November, 1975 issue, page 50, published by The Cahners Publishing Company, Inc., Boston, Mass.

The opposing, inner conduit 14 also includes a tubular end section 74 which defines opening 18 and which terminates in a concave frustoconically-shaped surface 76 that is concentric with opening 20 in outer conduit 12 and shaped complementarily to convex surface 68 of the opposing end section 66. The concave surface is dimensioned so that seal ring 72 can be received between the two frustoconical sealing surfaces when the tubular end sections are axially moved towards each other.

In use inner and outer sealed connections 26, 28 are formed by first bringing the left and right-hand (as seen in FIG. 2) conduit sets 12, 14 and 4, 6, respectively, into approximate axial alignment and placing seal rings 46, 72 in groove 44 and onto sealing surface 68, respectively. Thereafter, the conduit sets are axially moved towards each other. Since the tubular end sections 66, 74 are constructed so that they effectively protrude past the respective flanges 30, 34 the end sections engage each other before the flanges do. The conical sealing surfaces together with the conical seal ring, permit continued axial movement after their first, initial engagement but in doing so, they align the conduit sets should there exist a slight misalignment.

The combined protruding length of the tubular end sections is selected so that when a firm seal is established between the frustroconical seal ring 72 and its mating sealing surfaces, seal ring 46 is in simultaneous engagement with the opposing flange 30 and disc 34 and the disc exerts a biasing force against the seal ring which is sufficient to establish an initial, low-pressure seal. Thereafter the conduits can be pressurized so that fluids can flow in the inner and outer conduits independently of each other. It will be observed that in the illustrated embodiment, in which inner conduit 4 is a container and in which a fluid medium is circulated from the outer conduit 12 to the outer conduit or housing 6 and hence through openings 22 into the container and back to inner conduit 14, there is little or no pressure differential between the inner and outer conduits. Consequently, seal ring 72 is subjected to little or no differential pressures which facilitates the formation of that seal.

We claim:

1. A releasable high-pressure seal comprising aligned first and second conduits for flowing fluid under super-atmospheric pressure therethrough; first and second end flanges attached to the respective conduits, each flange having a central opening for flowing the fluid therethrough, the second flange having a periphery attached to the second conduit and being relatively resilient so that a portion of the second flange proximate its central opening can be resiliently biased towards the first flange; a seal ring disposed between the end flanges for sealing the interior of the conduits from the exterior; means for applying a force to the seal ring acting substantially parallel to the axis of the conduits and for varying as a function of the fluid pressure interior of the conduits; and means for securing the flanges to each other.

2. A seal according to claim 1 wherein the force-applying means comprises the seal ring disposed proximate to and encircling the central opening of the second flange and being further disposed relatively remote from the periphery of the second flange, whereby fluid pressure interior of the second conduit resiliently biases the second flange towards the first flange with a force directly proportional to the pressure differential between the interior and the exterior of the conduits.

3. A seal according to claim 1 including means for centering the conduits and the flanges with respect to each other when they are moved in an axial direction into mutual engagement.

4. A seal according to claim 3 wherein the centering means is defined by third and fourth aligned conduits disposed within the first and second conduits, respectively, and means attaching the third and fourth conduits to the first and second conduits, respectively.

5. A releasable, high-pressure seal comprising: a first conduit including a first, relatively rigid flange having a first opening therethrough; a second conduit including a second, relatively resilient flange having a second opening therethrough aligned with the first opening, the second flange having a periphery connected to the second conduit the second flange having a back side subjected to pressurized fluid flowing through the conduits and a front side facing the first flange; a seal ring disposed between the flanges and encircling the openings in relative close proximity the seal ring being wholly inside a peripheral extent of the back side; whereby fluid in the conduits pressurized above ambient pressure resiliently biases the flange and, therewith, the seal ring towards the first flange as a result of the pressure differential between a portion of the front side radially beyond the seal ring and a corresponding portion of the back side to increase the sealing pressure applied to the seal ring; means for securing the flanges to each other; and means for subjecting the seal ring to an initial sealing force independent of said sealing pressure.

6. A seal according to claim 5 wherein the last-mentioned means includes means resiliently positioning an inner portion of the second flange proximate the second opening relatively closer to the first flange than a remainder of the second flange when the second flange is in its relaxed state.

7. A seal according to claim 6 wherein the second flange has a frustroconical shape.

8. A seal according to claim 5 including means maintaining an externally open space between the portion of the front side and the first flange so that the space is at all times at ambient pressure.

9. A seal according to claim 8 wherein the space is defined by a recess formed in the portion of the front side.

10. A seal according to claim 5 including a third conduit disposed within the first conduit, and a fourth conduit disposed within the second conduit, the third and fourth conduits having aligned, mating ends positioned to engage each other when the flanges are secured to each other, and means establishing a seal between the ends of the third and fourth conduits so that two fluids can independently flow through the first and second conduits and through the third and fourth conduits.

11. A seal according to claim 10 wherein at least one of the first and second conduit ends projects beyond the corresponding flange a sufficient distance so that the third and fourth conduit ends engage each other before the seal ring engages both flanges, whereby the third and fourth conduit ends can be employed for centering the flanges with respect to each other when they are moved axially into mutual registration.

12. A seal according to claim 10 wherein the means for sealing the third and fourth conduit ends includes cooperating sealing surfaces which are angularly inclined with respect to the axis of the conduits, and a generally conical-shaped seal ring disposed between the inclined surfaces for sealing the interior of the third and fourth conduits from the interior of the first and second conduits.

13. A seal ring according to claim 10, wherein the third and fourth conduit ends are concentric with respect to the first and second openings.

14. A seal according to claim 5 wherein the securing means comprises cooperating, opposing peripheral collars protruding from the flanges, and clamp means for engaging the collar and drawing them together until the seal ring is biased into simultaneous engagement with both flanges.

15. A seal according to claim 13 wherein the collars extend over substantially 360°.

16. A seal according to claim 14 wherein the clamp comprises a pair of bars having a U-shaped cross-section sized to simultaneously engage the collars on the first and second flanges, means for pivotally attaching an end of one bar to an end of the other bar, the bars having a combined circumferential extent of 360°, and means for releasably locking other ends of the bars to each other.

17. A quick connect-disconnect high-pressure seal for a first set of inner and outer conduits and a second set of inner and outer conduits, the conduits of each set being rigidly secured to each other, the seal comprising in combination: a relatively rigid outer flange connected to an end of one of the outer conduits and an opposing, relatively resilient disc having a periphery connected to the other one of the outer conduit, the flange and the disc including aligned central opening for passage of fluid flowing in the outer conduits; a seal ring and means for retaining the seal ring to one of the flanges and the disc, the seal ring being disposed about and in close proximity to the openings; peripheral collars protruding from the flange and the disc; securing means for drawing the collars towards each other to thereby secure the disc to the flange and simultaneously contact the seal ring with the flange and the disc while exerting an initial sealing force against the seal ring; the inner conduits terminating in opposing end sections, the end sections being dimensioned so that they engage each other before the seal ring engages both the flange and the disc when the collars are drawn together, the end sections having a shape permitting relative axial movement between the conduits until the seal ring simultaneously contacts both the flange and the disc when the collars are drawn to each other; means establishing a seal between the end sections when the collars are drawn together; whereby the pressurization of fluid disposed within the outer conduits deflects the disc towards the flange and generates an axial force against the seal ring the magnitude of which is a function of the fluid pressure.

18. A seal according to claim 17 wherein the disc has a generally frustroconical shape, a portion of the disc proximate the opening being disposed closer to the flange than a portion of the disc attached to the outer conduit when the disc is in its relaxed state.

19. A seal according to claim 18 including a recess defined in a side of the disc and facing the flange and outwardly of the seal ring to facilitate the maintenance of ambient pressure between the disc and the flange outwardly of the seal ring and to further facilitate the deflection of the disc under fluid pressure.

20. A seal according to claim 19 wherein the end sections of the inner conduits include opposed, generally frustroconical, concentric surfaces, and wherein the means for sealing comprises a generally frustroconically-shaped seal ring disposed between the surfaces of the end sections.

21. A seal according to claim 18 wherein the securing means comprises a circumferential clamp defined by first and second, hingedly interconnected clamp sections and means for releasably locking the clamp sections to each other, each clamp section having a generally U-shaped configuration dimensioned to fit over the radial collars so tthat the seal ring simultaneously engages the flange and the disc and the disc is flattened relative to its relaxed state when the clamp is placed over the collars and the clamp sections are closed and locked to each other.

22. A seal according to claim 17 wherein one of the inner conduits comprises a container terminating in one of the end sections, and including means establishing fluid communication between the interior of the container and the exterior thereof so that fluid can flow from the interior of the corresponding outer conduit, into the container and hence past the end sections into the other one of the inner conduits.

23. A method for establishing a releasable high-pressure seal between two sets of conduits, each set having an outer conduit and at least one inner conduit rigidly secured to the outer conduit, at least one of the inner conduits projecting past an end of the associated outer conduit a sufficient distance so that when the conduit sets are axially moved towads each other the inner conduits establish contact before the outer conduits do, the method comprising the steps of: positioning the conduit sets in substantial alignment with each other; placing a sealing member between the outer conduits; moving the conduit sets in an axial direction towards each other; engaging ends of the inner conduits to thereby axially align the conduit sets; continuing the relative axial movement of the conduit sets until the sealing member is engaged by both outer conduits; securing the ends of the outer conduits to each other to establish an initial sealing force between the outer conduits and the sealing member; raising the fluid pressure interiorly of the outer conduits relative to the ambient fluid pressure; and increasing the sealing force between the outer conduits and the sealing member as a function of the interior fluid pressure increase.

24. A method according to claim 23 wherein the step of increasing the sealing force comprises the step of generating with the interior fluid pressure a force which acts in an axial direction and which is applied against the sealing member.

25. A method according to claim 24 wherein the step of generating comprises the steps of subjecting a side of a generally disc-shaped member disposed between the outer conduits and in contact with the sealing member to the internal pressure while maintaining at least a portion of another side of the disc-shaped member at ambient pressure.

26. A method according to claim 22 including the step of forming a seal between the ends of the interior conduits at the point of axial movement between the conduit sets at which the sealing member is in contact with both outer conduits.

* * * * *